United States Patent [19]

Kasai

[11] Patent Number: 4,735,514

[45] Date of Patent: Apr. 5, 1988

[54] ROLLER BEARING FOR AN INFINITE RECTILINEAR MOTION

[75] Inventor: Naomi Kasai, Tokyo, Japan

[73] Assignee: Nippon Thompson Co., Ltd., Tokyo, Japan

[21] Appl. No.: 938,384

[22] Filed: Dec. 5, 1986

[30] Foreign Application Priority Data

Mar. 13, 1986 [JP] Japan .............................. 61-36900[U]

[51] Int. Cl.$^4$ .............................................. F16C 29/06
[52] U.S. Cl. ...................................................... 384/44
[58] Field of Search .................. 384/44, 471, 571, 622; 464/168

[56] References Cited

U.S. PATENT DOCUMENTS

| | | | |
|---|---|---|---|
| 4,496,198 | 1/1985 | Geka | 384/44 |
| 4,504,097 | 3/1985 | Mottate | 384/44 |
| 4,511,189 | 4/1985 | Mottate | 384/44 |
| 4,556,262 | 12/1985 | Geka | 384/44 |

*Primary Examiner*—Lenard A. Footland
*Attorney, Agent, or Firm*—Trexler, Bushnell, Giangiorgi & Blackstone, Ltd.

[57] ABSTRACT

A roller bearing for an infinite rectilinear motion is composed of a long truck rail; a casing mounted astride the truck rail, and having truck faces in opposition to the truck faces of the truck rail, and having return passages for rollers arranged in a parallel-roller type between the faces of the truck rail and the casing. Side plates having direction change passages are fixed on the both longitudinal ends of the casing, and the direction change passages connect the truck face and the return passage. A shifting passage is formed at the connection of the truck face with the direction change passage to cause the rollers to go away off the truck rail without changing the angle between the roller axis and the horizon. Further, a twisting passage follows the shifting passage to change the angle between the roller axis and the horizon. Those passages enable rollers to smoothly go in and out of the truck face with relatively less resistance. As a four row parallel roller type, the present bearing can be made to have the smallest sectional height, and at a reasonable price. Incidentally the twisting passage can be made in the manner that it is twisted while gradually going away off the truck rail.

2 Claims, 7 Drawing Sheets

ROLLER BEARING FOR AN INFINITE RECTILINEAR MOTION

BACKGROUND OF THE INVENTION

1. Field of Industrial Utilization

The present invention relates to a roller bearing to place two members relatively in an infinite rectilinear motion by endlessly circulating cylindrical rollers or long cylindrical rollers which are inserted between two members. More specifically it relates to a bearing for an infinite rectilinear motion of what is called a parallel roller type, wherein cylindrical rollers in the track faces of rolling rows of the rollers are so arranged that axes of the rollers are parallel with each other, and are directed in the same direction; and said roller bearing is improved in the direction change passage for causing rollers in the track to change their direction and leading them to a return passage.

2. Prior Art

In the type of arrangement of rollers in a track face for this kind of roller bearings for an infinite rectilinear motion, there can be classified the cross roller type wherein rollers are so arranged that axes of adjacent rollers may cross at right angles with each other, and the parallel roller type wherein rollers are so arranged that axes of adjacent rollers are directed in the same direction.

In the cross-roller-type-bearing, two rows of endlessly circulating rollers (endless circulation passage) are sufficient for enabling rollers to carry loads burdened from every direction, hence roller bearings having a relatively small sectional height can be manufactured in this type.

The parallel-roller-type-bearing, however, requires at least four rows of endless circulation passages for rollers, in order to enable rollers to carry loads burdened from every direction. This bearing type has many defects in that the width and height of the bearing will become too great (for example, see Japanese Patent Application No. 248789-1983), or that the construction of members of the endless circulation passage will become complicated (for example, see Japanese Patent Application No. 94552-1981) etc., thus leaving problems in miniaturization and costs for construction.

The following is description given with reference to FIG. 7 of defects of bearings of conventional parallel roller type. Since FIG. 7 is symmetric with the center line, symbols are given for only members at the left side of the center line. In mounting the casing 11 astride the track rail 12, rollers 13 and 13A, when viewed in the sliding direction, are inclined, for example, at 45 degrees relative to the sliding plane for the bearing, or to the horizontal plane, and the rollers are so arranged that extension lines (not shown) of each axis (rotation axes) of the rollers 13 and 13A may cross at right angles with each other, in order for the rollers to be able to carry loads burdened from every direction. Return passages 14, 14A are formed in the casing 11, and the two track grooves in which rollers 13 and 13A exist and the return passages 14 and 14A are communicated with each other respectively by direction change passages 15 and 15A.

In order for the rollers to be able to move smoothly in the track grooves, the direction change passages 15 and 15A, and the return passages 14 and 14A, each of the return passages 14 and 14A needs to be formed at a location inclined by 45 degrees, from the two truck grooves relative to the sliding plane for the bearing (horizontal plane). Hence, the height $h_1$ of the casing 11 of such a parallel-roller-type becomes very great as compared with a cross-roller-type-bearing. That is, in the conventional parallel roller type, a sectional height of a bearing will inevitably be great due to motional characteristics of the rollers, and it leads to increase in number of parts thereof, as well as in the manufacturing cost.

To reduce the height of the casing, there has been proposed formation of the track grooves, the direction change passages 15 and 15A, and the return passages 14 and 14A in a crosswisely arranged relationship, as shown in FIG. 8. In this case, the height $h_2$ of the casing 11 can be made smaller than in the case of FIG. 7 (the height $h_1$). It requires, however, very complicated and difficult working processes to work and form the inside of the casing 11 in the manner such that the direction change passages 15 and 15A may cross with each other without any interference between them, further highly accurate work thereof is difficult, and the manufacturing cost will also be increased.

SUMMARY OF THE INVENTION

Object of the Invention

The present invention has it as its objects to solve the aforesaid defects of the conventional parallel-roller-type-roller bearing for a rectilinear motion, and to provide a miniaturized roller bearing for an infinite rectilinear motion at a reasonable price.

Constructions to Solve The Problem

To attain the above object, the present invention is provided with the following construction;

In a roller bearing for an infinite rectilinear motion including,
- a long track rail in which a track face is formed on an outside face thereof;
- a casing which is mounted astride said track rail, and in which a track face is formed at a location opposite to the track face of said track rail, and
- a number of rollers to be inserted between the track face of said track rail and the track face of said casing,
- said rollers being arranged on the basis of a parallel roller type,
- a return passage for said rollers being provided in said casing,
- side plates wherein direction change passages are formed being fixed to the both longitudinal end portions of said casings, said direction change passages connecting said track face with said return passage,
- the roller bearing for an infinite rectilinear motion is characterized in that,
- shifting passages are formed at the connection portions of said direction change passages with said track faces, at least in a pair of rows of rollers, so that said rollers may be moved away from the track rail, without changing an angle formed by the axis of the roller and a plane (horizontal plane) in the sliding direction, viewed in the sliding direction of the bearing; and
- following each of said shifting passage, a twisting passage is formed, so that in the twising passage, an angle formed by the axis of the roller and the plane (horizontal plane) in the sliding direction, viewed in the slding direction of the bearing, may change.

In the other working example of the present invention, there is provided a bearing characterized in that said twisting passage in said direction change passage formed within the side plate is twisted while gradually going away (being shifted) from said track rail.

Action of The Present Invention

In the present invention, since the shifting passage and the twisting passage are formed in the direction change passage, the track face and the return passage can be formed approximately on the same horizontal face, further the motion of the rollers which are moving on from the track face through the direction change passage can be smoothly effected, and the resistance can be reduced.

BRIEF DESCRIPTION OF DRAWINGS

FIG. 1 is a perspective view, showing the first embodiment of the present invention;

FIG. 2 is a sectional front section of FIG. 1;

FIG. 3 is a side view seen in the direction A in FIG. 2;

FIG. 4 is a sectional view of FIG. 2, seen in the directed B;

FIG. 5 is a perspective view of cylindrical rollers, seen in the direction C in FIG. 2;

FIG. 6 is a sectional view, illustrating the second embodiment of the present invention.

DETAILED DESCRIPTION OF THE EMBODIMENTS

Figure 1:
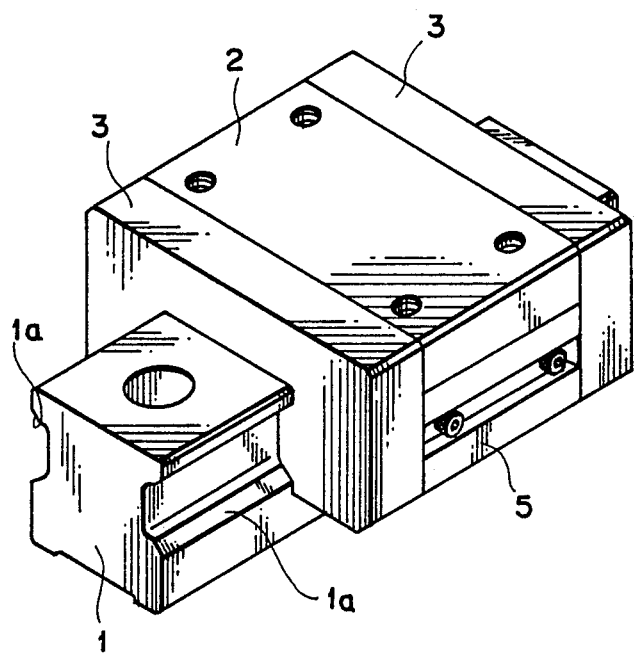
FIG. 1 to FIG. 6 illustrate embodiments of the present invention.

Referring to the drawings, embodiments of the present invention will be explained in detail in the below.

Figure 2:
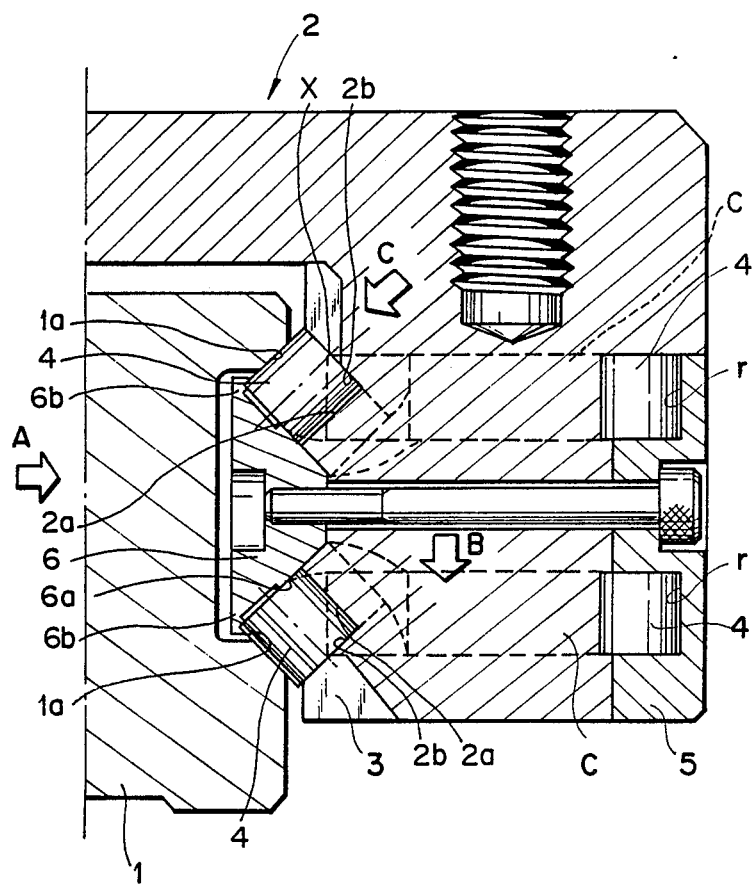

The first embodiment of the present invention is shown in FIGS. 1-5. FIG. 1 is a perspective diagram showing a general view of the first working example; FIG. 2 shows construction of the upper and lower two rows of rollers on the right side of the center line, among four rows of the cylinder rollers 4.

A track face 1a for rollers is formed on each slant face of both edges of recessed portion formed on both side faces of the long track rail 1 having a nearly I-shaped section. Track face 2a is formed on each inside facial portion opposite to said track faces 1a, in casing 2 having a reversed U-shaped section which is mounted astride the track rail 1. A number of cylindrical rollers 4 are arranged between the track face 1a of the track rail 1 and the track face 2a of the casing 2, and the cylindrical rollers 4 circulate endlessly in the endlessly circulating passage composed of the track face, the direction change passage, and the return passage. A side plate 3 and a return passage cover 5 are fixed to predetermined portions of the casing 2.

Since the arrangement of rollers is of the parallel roller-type, the axes of rollers on the track face, viewed in the sliding direction, are inclined by 45 degrees relative to the plane in the sliding direction (horizontal plane) of the bearing. Skew of the cylindrical roller 4 on the track face is restrained by the guide face 6a of the supporting plate 6 and the guide face 2b of the casing 2. At the same time, the roller 4 is held by such a supporting portion 6b of supporting plate 6 that is provided with projections on both longitudinal ends thereof, so that the rollers may not fall off, even if the casing 2 is removed from the track rail 1.

The return passages r to return the cylindrical rollers are formed by the spaces between both outside faces of the casing 2 and the return passage covers 5.

Figure 3:
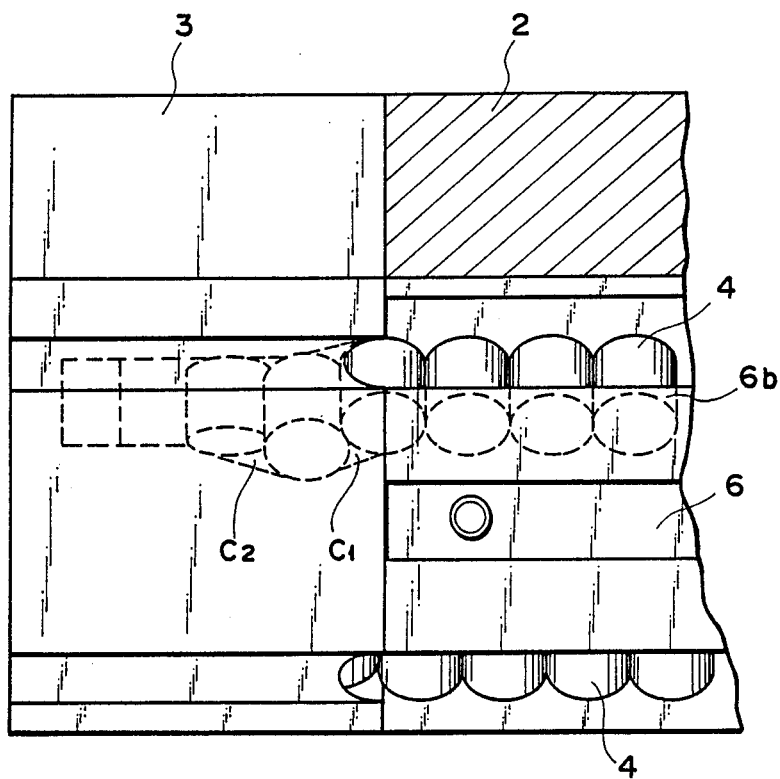

FIG. 3 is a side view seen in the direction A in FIG. 2. On both end portions in the sliding direction of the casing 2 are fixed respectively side plates wherein direction change passages c are formed for communicating the return passages r (FIG. 2) with the track faces 2a (FIG. 2). The cylindrical roller 4 guided into the side plate 3 is firstly caused to go away graually from the track rail 1 (shifted) without changing the inclination of the axis of the roller relative to the plane in the sliding direction (horizontal plane), viewed in the sliding direction. Then the roller gradually changes the inclination of its axis relative to the plane in the sliding direction (horizontal plane), viewed in the sliding direction, to set finally its axis perpendicular to the plane.

Figure 4:
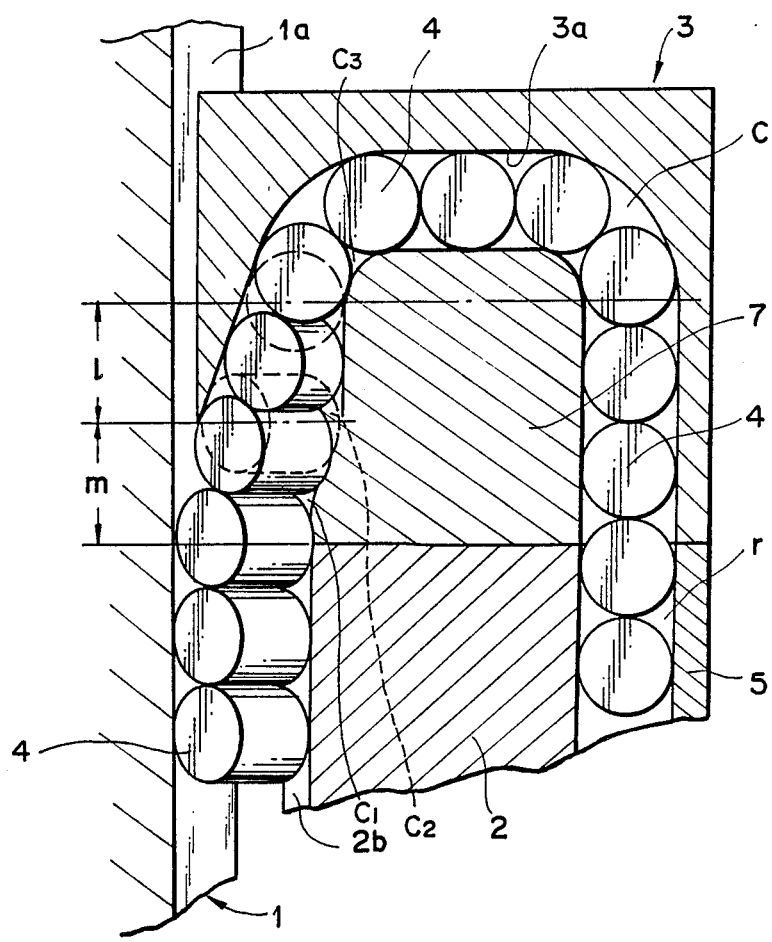

FIG. 4 is a sectional view of a row of rollers on the lower side of FIG. 2, viewed in the direction B. A direction change groove 3a is formed in the side plate 3 fixed on the end face of the casing 2, and the space between the direction change groove 3a and a spacer 7 set at a predetermined position defines a direction change passage c within the side plate 3. As described in the above, an endlessly circulating passage for the cylindrical rollers 4 is constructed by the truck face, the direction change passage c, and the return passage.

The angle made between the axis of the cylindrical roller 4 and the horizontal face (the plane in the sliding direction), viewed from the sliding direction, is 45 degrees in rows on the both the upper and lower sides, and extensions of axes of each roller in the upper and lower track faces cross with each other at right angles in the bearing, consequently the bearing has a contruction to be able to carry loads burdened from every direction.

A shifting passage c1 is formed, in the direction change passage c formed in the side plate 3, and in the portion to be connected with the track face, so as to enable the roller to go away from the track rail 1, drawing an arc-shaped locus, without changing the angle (45°) between the axis of the cylindrical roller 4 and the horizontal plane, viewed in the sliding direction. The length of the shifting passage c1 in the direction of the motion of the cylindrical roller 4 is represented by symbol m in FIG. 4. The shifting passage c1 enables the cylindrical roller 4 to go away from the track face, at the location adjacent to the border of the track face and the direction change passage, without changing the angle between the axis of the roller and the horizontal face, viewed in the horizontal direction. Accordingly, the cylindrical roller 4 can move more smoothly at the location adjacent to the border, and the slide resistance will be reduced. The length m is determined by a predetermined shift amount of the roller (the length from the track rail 1 to the roller 4 at the end of the shifting passage c1), but the shift amount is set not more than a roller diameter, (a practical shift amount may be set by removing the roller from the track rail by several millimeters.)

Following the shifting passage c1, a twisting passage c2 is formed for changing the angle formed by the axis of the roller and the horizontal face, and the passage is twisted in the range of distance l in the direction of the motion of the roller 4. If the value l is set greater, the roller may move more smoothly, but on the other hand, the length of the side plate 3 may accordingly be prolonged. For practical purpose, the measurement l is set about twice the diameter of the roller.

Following the twisting passage c2, an arc passage c3 is formed. The arc passage c3 effects the direction change of the roller 4 into the return passage 4.

The cylindrical roller 4 introduced from the track face 2a into the side plate 3 is shifted smoothly by the twisting passage c1 into the side plate 3, and is caused to go away off the track face 1a of the track rail 1, subsequently it moves through the twisting passage c2, while the angle formed by the axis of the cylindrical roller and the horizontal face, viewed in the sliding direction, is changed gradually from 45 degrees to 90 degrees.

When the cylindrical roller 4 has advanced by a distance of (m+l) in the direction of the motion in the side plate 3, the axis will be completely perpendicular to the horizontal face; and in the following unloaded zone, the roller 4 advances in a state wherein the angle between the axis and the horizontal face, viewed in the sliding direction, remains to be 90 degrees.

Referring to row of the cylindrical rollers on the upper side of FIG. 2, study is made of the manner how each roller is twisted in the twisting passage c2; in the first embodiment, there is adopted a method where after the roller has been shifted, the roller is twisted, while being moved approximately rectilinearly in the direction of the motion, with the position X of the highest height of the cylindrical roller in the twisting passage as the basis of twisting, and when the roller has been completely twisted, it is moved to the arc passage c3. But acceptable is also such a method that the entire roller is removed gradually from the track rail 1, while being twisted (a method of shifting a roller, while twisting it), and also acceptable is a method where the aforesaid two methods are blended, that is, a method where a roller is twisted simply without changing the basis (of twisting the roller) for a certain distance, and thereafter the roller is shifted while being twisted.

Figure 5:
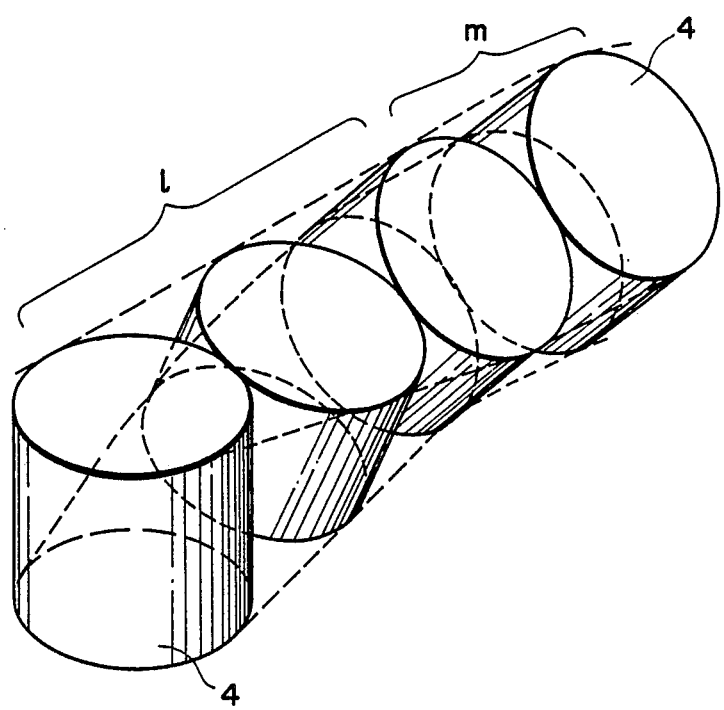

FIG. 5 is a perspective view illustrating schematically a behavior of the cylindrical roller which takes from the shifting passage c1 to the twisting passage c2 in the upper row of the rollers in FIG. 2. There can be seen that the cylindrical roller moves from the track face to the side plate, namely to the forward direction in FIG. 5; the roller moves arcuately in the range m, without changing the angle (45°) between the axis of the roller and the horizontal face, viewed in the sliding direction, and in the range l, the roller is twisted, and said angle is being changed from 45 degrees to 90 degrees.

Incidentally, in the first embodiment illustrated in FIG. 1 to FIG. 5, it is also possible that the casing 2 is formed separably into a portion to be fixed with other members and a portion of the skirt of the bearing portion, and that the position of the skirt portion is made changeable for optionally setting a measurement of the bearing.

Thus according to the first embodiment, notwithstanding that the bearing type is a 4-row parallel-roller type, the return passage can be formed on the position approximately same horizontal plane as each load zone (the track face). Accordingly, construction of the whole bearing can be made very simple, and a miniaturized and highly accurate roller bearing for an infinite rectilinear motion can be provided at a reasonable price.

Figure 6:
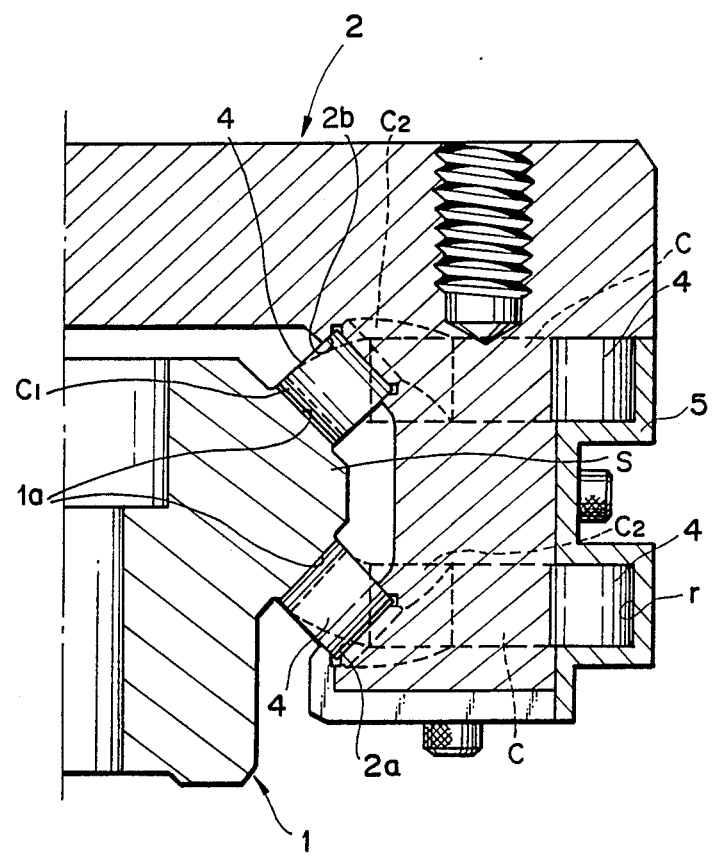
Figure 7:
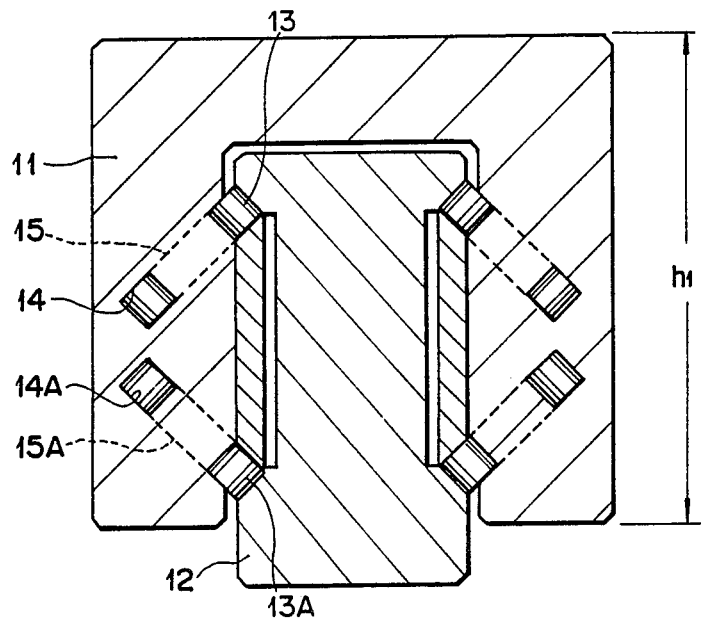
FIG. 7 and FIG. 8 are diagrams for conventional arts.
Figure 8:
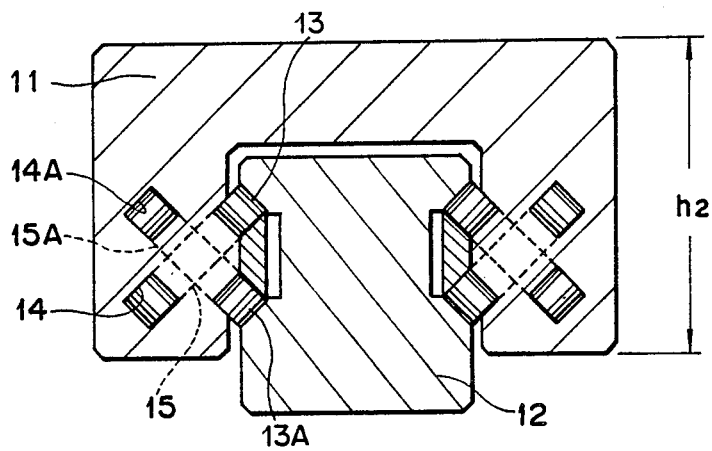

FIG. 6 illustrates a second embodiment of the present invention. In the first embodiment, the track face 1a is formed in the inclined portions of both inside faces of the recessed portions of the track rail (the recess accommodating the supporting plate 6 in FIG. 2); while in the second embodiment illustrated in FIG. 6, the track face is formed in such a manner as the projecting portion S of the track rail 1 being held between. The twisting passage c2 of the direction change passage c in the second embodiment is twisted, while being caused to go gradually away off the track rail 1. When the shift amount is increased, the twist of the roller will become gentle, and the moving resistance of the roller can be further reduced.

In the second embodiment, the angle which the roller axis in the track face forms with the horizontal face, viewed in the sliding direction, is 45 degrees in either roller row on the upper and lower sides, but the bearing may also have such a construction that the angle formed by the axis of the roller in the upper row with the horizontal face is made 0 degree, and the angle thereof on the lower row is made 45 degrees, thus the twist is given in the direction change passage only for the lower row of the roller.

Further it is also practicable in the preset invention that the diameter of the cylindrical roller in the upper row is made different from the diameter of the cylindrical roller in the lower row, according to use conditions; or that the angle between the axis of the roller and the horizontal face, viewed in the sliding direction, is made other than 45 degrees, etc.

And as a rolling body, not only the cylindrical roller as shown in the drawings, but also long cylindrical rollers may also be employed, as the case may be.

EFFECT OF THE INVENTION

The present invention has the following effects.

(1) The roller can smoothly go in, or go out of the track face, and the sliding resistance of the bearing can be reduced.

(2) As a bearing of a four-row parallel-roller type, the lowest possible sectional height can be attained.

(3) Since the construction of the endlessly circulating passage of rollers can be made simple, manufacturing cost becomes relatively low.

(4) As compared with a two-row cross-roller type, the loading capacity is great.

What is claimed is:

1. In a roller bearing for an infinite rectilinear motion including, a long track rail in which a track face is formed on the outside face thereof, a casing which is mounted astride said track rail, in which a track face is formed at a location opposite to the track face of said track rail, and a number of rollers inserted between the track face of said track rail and the track face of said casing, said rollers being arranged on the basis of a parallel roller type, a return passage for said rollers being provided in said casing, and side plates wherein direction change passages are formed being fixed to the longitudinally opposite end portions of said casing, said direction change passages connecting said track face with said return passage, the roller bearing for an infinite rectilinear motion is characterized in that, the longitudinal axis of each return passage for rollers substantially extends on a horixontal plane including the longitudinal axis of the load bearing trackway that is in turn formed between the track face of the track rail and that of the casing, means defining shifting passages being formed at least in a pair of rows of rollers at the connection portions of said direction change passages with said track faces, so that said rollers may be moved away from the track rail, without changing an angle formed by the axis of the roller and a plane in the sliding direction, viewed in the sliding direction of the bearing; and following each of said shifting passages, means defining a twisting passage being formed, so that in the twisting passage, an angle formed by the axis of the roller and the plane in the sliding direction, viewed in the sliding direction of the bearing, may change.

2. A roller bearing for an infinite rectilinear motion according to claim 1, wherein a twisting passage of said direction change passage formed in the side plate is twisted, while at the same time is gradually departing from the track rail within such a distance equal to half the diameter at most of the roller on the horizontal plane including the longitudinal axis of the load bearing trackway.

* * * * *